US011436077B2

(12) United States Patent
Wu et al.

(10) Patent No.: US 11,436,077 B2
(45) Date of Patent: Sep. 6, 2022

(54) SERIAL MANAGEMENT INTERFACE WITH IMPROVED RELIABILITY

(71) Applicant: Marvell Asia Pte., Ltd., Singapore (SG)

(72) Inventors: Dance Wu, Palo Alto, CA (US); Chuanhai Zhou, Pudong (CN); Hong Yu Chou, Saratoga, CA (US)

(73) Assignee: MARVELL ASIA PTE LTD., Singapore (SG)

( * ) Notice: Subject to any disclaimer, the term of this patent is extended or adjusted under 35 U.S.C. 154(b) by 0 days.

(21) Appl. No.: 17/322,230

(22) Filed: May 17, 2021

(65) Prior Publication Data

US 2021/0271543 A1 Sep. 2, 2021

Related U.S. Application Data

(63) Continuation of application No. 16/690,803, filed on Nov. 21, 2019, now Pat. No. 11,023,312.

(60) Provisional application No. 62/770,537, filed on Nov. 21, 2018.

(51) Int. Cl.

*G06F 11/10* (2006.01)
*G06F 13/42* (2006.01)

(52) U.S. Cl.

CPC ...... *G06F 11/1004* (2013.01); *G06F 13/4282* (2013.01)

(58) Field of Classification Search

CPC ............. G06F 11/1004; G06F 11/1048; G06F 13/4282; G06F 13/36; G06F 13/385; G06F 13/1668

See application file for complete search history.

(56) References Cited

U.S. PATENT DOCUMENTS 8,200,473 B1 * 6/2012 Dropps ................. H04L 69/324 703/21
2007/0101043 A1 * 5/2007 Herman ............. G06F 13/4004 710/315
2014/0164647 A1 6/2014 Lee
2018/0196770 A1 7/2018 Woo et al.
2019/0171595 A1 6/2019 Mishra et al.
2020/0195450 A1 * 6/2020 Bains ................. G06F 13/1668

* cited by examiner

*Primary Examiner* — Shelly A Chase

(57) ABSTRACT

A first serial management interface device includes an input/output pin, a register, and a controller. The controller is configured to send a first frame to a second serial management interface device via the input/output pin. The controller is configured to generate an error code based on the first frame sent to the second serial management interface device. The controller is configured to store the error code in the register to send to the second serial management interface device.

8 Claims, 15 Drawing Sheets

| 01 | 01 | 0x1B | 0x18 | TA | Reserved | EC Bits |

| 01 | 10 | 0x1B | 0x18 | TA | Status | EC Bits |

| 00 | 00 | 0x1B | 0x03 | TA | Reserved | 0x8018 |
| 00 | 01 | 0x1B | 0x03 | TA | | EC Bits |

| 00 | 00 | 0x1B | 0x03 | TA | | 0x8018 |
| 00 | 10 | 0x1B | 0x03 | TA | Status | EC Bits |

| 01 | 00 | PHYAD | REGAD | TA | Data | |
| 01 | 01 | 0x1B | 0x18 | TA | Reserved | EC Bits |
| 01 | 10 | 0x1B | 0x18 | TA | Status | EC Bits |

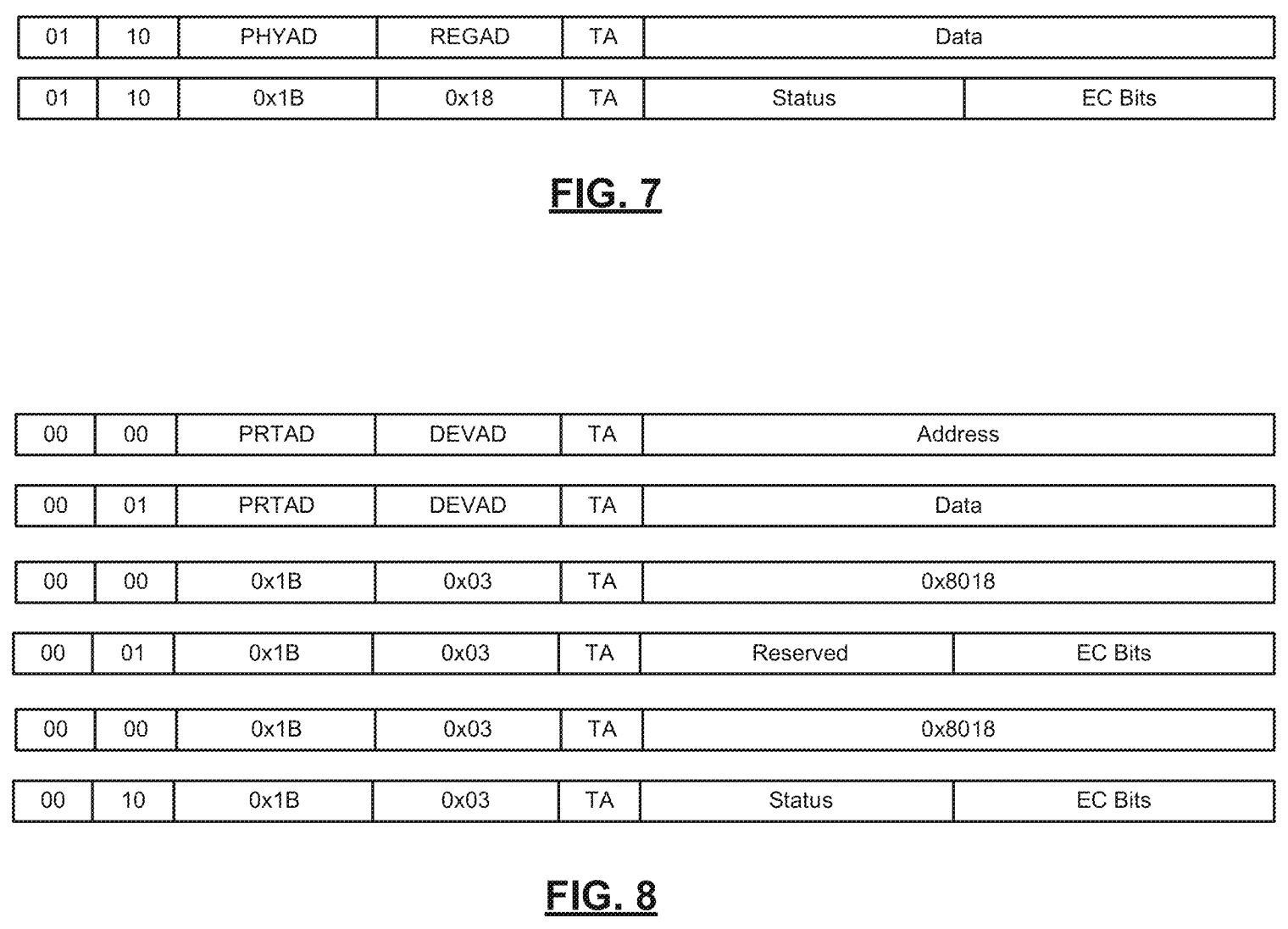

| | | | | | | |
|---|---|---|---|---|---|---|
| 01 | 10 | PHYAD | REGAD | TA | Data | |
| 01 | 10 | 0x1B | 0x18 | TA | Status | EC Bits |

FIG. 7

| | | | | | | |
|---|---|---|---|---|---|---|
| 00 | 00 | PRTAD | DEVAD | TA | Address | |
| 00 | 01 | PRTAD | DEVAD | TA | Data | |
| 00 | 00 | 0x1B | 0x03 | TA | 0x8018 | |
| 00 | 01 | 0x1B | 0x03 | TA | Reserved | EC Bits |
| 00 | 00 | 0x1B | 0x03 | TA | 0x8018 | |
| 00 | 10 | 0x1B | 0x03 | TA | Status | EC Bits |

FIG. 8

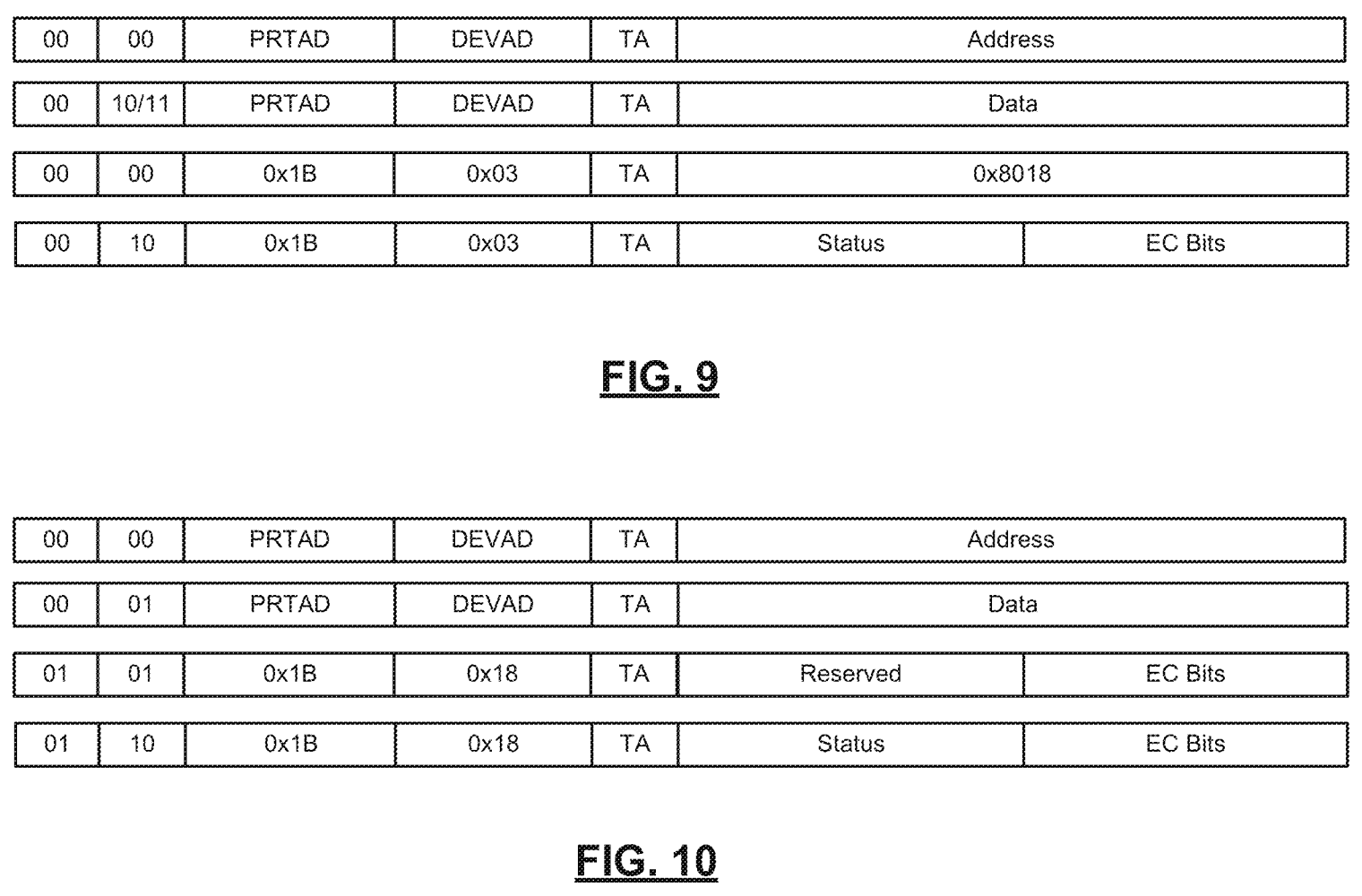

| | | | | | | |
|---|---|---|---|---|---|---|
| 00 | 00 | PRTAD | DEVAD | TA | Address | |
| 00 | 10/11 | PRTAD | DEVAD | TA | Data | |
| 00 | 00 | 0x1B | 0x03 | TA | 0x8018 | |
| 00 | 10 | 0x1B | 0x03 | TA | Status | EC Bits |

FIG. 9

| | | | | | | |
|---|---|---|---|---|---|---|
| 00 | 00 | PRTAD | DEVAD | TA | Address | |
| 00 | 01 | PRTAD | DEVAD | TA | Data | |
| 01 | 01 | 0x1B | 0x18 | TA | Reserved | EC Bits |
| 01 | 10 | 0x1B | 0x18 | TA | Status | EC Bits |

FIG. 10

SERIAL MANAGEMENT INTERFACE WITH IMPROVED RELIABILITY

CROSS-REFERENCE TO RELATED APPLICATIONS

The present disclosure is a continuation of U.S. patent application Ser. No. 16/690,803 filed on Nov. 21, 2019, which claims the benefit of U.S. Provisional Application No. 62/770,537, filed on Nov. 21, 2018. The entire disclosures of the applications referenced above are incorporated herein by reference.

FIELD

The present disclosure relates to serial management interfaces.

BACKGROUND

The background description provided herein is for the purpose of generally presenting the context of the disclosure. Work of the presently named inventors, to the extent the work is described in this background section, as well aspects of the description that may not otherwise qualify as prior art at the time of filing, are neither expressly nor impliedly admitted as prior art against the present disclosure.

Management Data Input/Output (MDIO) is a 2-wire serial bus that is used to remotely manage registers of one or more devices. For example, MDIO can be used to manage one or more physical layer devices (PHYs) in media access controllers (MACs) of Ethernet devices. MDIO can also be used for other applications. The management of these PHYs is based on access to and modification of registers. The registers provide status and control information such as: link status, speed ability and selection, power down for low power consumption, duplex mode (full or half), auto-negotiation, fault signaling, and loopback.

Switch registers can be accessed through a Serial Management Interface (SMI) using a Management Data Clock (MDC) pin and a bi-directional MDIO pin. A bit stream transferred on the MDIO pin follows protocols defined in Clause 22 and Clause 45 of IEEE Standard 802.3-2018. The bits indicate the protocol type (Clause 22 or Clause 45), the access type (write or read), target address and data.

The frame format for Clause 22 includes ST, OP, PHYAD, REGAD, TA and DATA fields. The ST field indicates a start of frame (01 for Clause 22). The OP field indicates write (01) and read (10). The PHYADR and REGADR includes PHY and register addresses, respectively. TA indicates the turn-around time to change bus ownership. DATA includes data bits.

Clause 45 provides enhancements for low voltage operation and the ability to address additional devices. The frame format for Clause 45 includes ST, OP, PHYAD, DEVAD, TA and ADDR/DATA fields. The ST field indicates a start of frame (00 for Clause 45). The OP (01) indicates write access and OP (10/11) indicates read access. DEVAD defines device type. The Address/DATA field defines an address or data.

In some applications such as automotive applications, interference may affect the bit stream transferred on the MDIO pin (and/or a clock signal transferred on the MDC pin). Automotive applications are subjected to harsher environmental conditions such as increased vibration, higher temperature and/or humidity variations, higher electromagnetic interference (EMI), etc. as compared to other SMI applications such as devices used in data centers. The interference may cause an access protocol, access type, address and/or data to be incorrect. Severe consequences may occur if a critical register is configured incorrectly or an SMI master is misled by incorrect read data.

SUMMARY

A serial management interface master device includes an input/output pin and a controller including an error code calculator. The controller is configured to output a first access frame on the input/output pin to cause data to be written to a first register of a serial management interface slave device connected to the input/output pin; cause the error code calculator to generate first error code bits based on the first access frame sent to the serial management interface slave device; and output a second access frame including the first error code bits to the serial management interface slave device on the input/output pin to cause the first error code bits to be written to a second register of the serial management interface slave device.

In other features, the first error code bits are further based on a portion of the second access frame excluding the first error code bits. The controller generates the first access frame and the second access frame in a frame format that is compliant with one of Clause 22 and Clause 45 of IEEE 802.3-2018. The controller is configured to output a third access frame to the input/output pin to cause at least one of error code bits and status bits stored in third and fourth registers, respectively, of the serial management interface slave device to be read. The controller is further configured to output a third access frame on the input/output pin to cause data from a third register of the serial management interface slave device connected to the input/output pin to be read; and output a fourth access frame to the input/output pin to cause at least one of second error code bits and status bits stored in fourth and fifth registers, respectively, of the serial management interface slave device to be read.

In other features, the controller further includes an error code calculator configured to calculate third error code bits based on the third access frame and a portion of the fourth access frame. The controller is further configured to compare the second error code bits to the third error code bits; and to verify the fcsecond access frame if the second error code bits match the third error code bits.

In other features, the controller is further configured to compare the second error code bits to the third error code bits; and discard the second access frame if the second error code bits do not match the third error code bits.

A serial management interface slave device includes an input/output pin, a plurality of registers, and a controller. The controller is configured to receive a first access frame from a serial management interface master device via the input/output pin and to write data to a first one of the plurality of registers based on the first access frame; and receive a second access frame from the serial management interface master device on the input/output pin including first error code bits based on the first access frame.

In other features, the first error code bits are further based on a portion of the second access frame. The first access frame and the second access frame received by the serial management interface slave device have a frame format compliant with one of Clause 22 and Clause 45 of IEEE 802.3-2018. The controller includes an error code calculator, and wherein the controller is further configured to cause the error code calculator to generate second error code bits based on the first access frame and a portion of the second access frame.

In other features, the controller includes an error code comparator, and wherein the controller is further configured to cause the error code comparator to compare the first error code bits to the second error code bits. The controller includes a plurality of registers. The controller is configured to release the first one of the plurality of registers if the first error code bits match the second error code bits. The controller is configured to discard the first access frame and the second access frame if the first error code bits do not match the second error code bits. The controller is further configured to receive a third access frame to read data from a third one of the plurality of registers and a fourth access frame to read at least one of error code bits and status bits from fourth and fifth ones of the plurality of registers.

In other features, the controller is further configured to receive a third access frame from the serial management interface master device and to output the second error code bits.

A serial management interface master device includes an input/output pin; and a controller configured to select a first read/write mode and a second read/write mode. In the first read/write mode, the controller is configured to write data to a serial management interface slave device and read data from the serial management interface slave device connected to the input/output pin by generating write and read access frames, without verification using error code bits, using a frame format that is compatible with a first clause and a second clause of a serial management interface protocol. In the second read/write mode, the controller is configured to write data to and read data from the serial management interface slave device connected to the input/output pin using the first clause and the second clause of the serial management interface protocol with verification by generating write and read access frames and additional access frames that include error code bits and that have a frame format that is compliant with at least one of the first clause and the second clause of the serial management interface protocol.

In other features, the first clause corresponds to Clause 22 of IEEE 802.3-2018 and the second clause corresponds to Clause 45 of IEEE 802.3-2018.

A serial management interface master device includes an input/output pin and a controller. The controller is configured to cause write data to be written to a serial management interface slave device and read data to be read from the serial management interface slave device connected to the input/output pin in compliance with a first clause of a serial management interface protocol including at least one of a write access frame including both write data and a write address, and a write error code access frame including error code bits based on the write access frame and a portion of the write error code access frame. A read access frame includes both read data and a read address and a read error code access frame including error code bits based on the read access frame and a portion of the read error code access frame.

In other features, the controller is further configured to write data to the serial management interface slave device and read data from the serial management interface slave device connected to the input/output pin in compliance with a second clause of the serial management interface protocol including at least one of first and second access frames including a write address and write data, respectively, and first and second error code access frames including a write error code address and write error code, respectively; and third and fourth access frames including a read address and read data, respectively, and third and fourth error code access frames including a read error code address and read error code, respectively.

In other features, the write error code is based on the first access frame, the second access frame, the first error code access frame, and a portion of the second error code access frame.

In other features, the read error code is based on the third access frame, the fourth access frame, the third error code access frame, and a portion of the fourth error code access frame. The first clause corresponds to Clause 22 of IEEE 802.3-2018 and the second clause corresponds to Clause 45 of IEEE 802.3-2018. The controller is further configured to cause write data to be written to the serial management interface slave device and read data to be read from the serial management interface slave device connected to the input/output pin using a hybrid protocol that is based on both the first clause and the second clause of the serial management interface protocol.

A method for operating a serial management interface for a master device includes outputting a first access frame on an input/output pin to cause data to be written to a first register of a serial management interface slave device connected to the input/output pin; causing the error code calculator to generate first error code bits based on the first access frame sent to the serial management interface slave device; and outputting a second access frame including the first error code bits to the serial management interface slave device on the input/output pin to cause the first error code bits to be written to a second register of the serial management interface slave device.

In other features, the first error code bits are further based on a portion of the second access frame excluding the first error code bits. The first access frame and the second access frame have a frame format that is compliant with one of Clause 22 and Clause 45 of IEEE 802.3-2018. The method includes outputting a third access frame to the input/output pin to cause at least one of error code bits and status bits stored in third and fourth registers, respectively, of the serial management interface slave device to be read.

In other features, the method includes outputting a third access frame on the input/output pin to cause data from a third register of the serial management interface slave device connected to the input/output pin to be read; and outputting a fourth access frame to the input/output pin to cause at least one of second error code bits and status bits stored in fourth and fifth registers, respectively, of the serial management interface slave device to be read.

In other features, the method includes calculating third error code bits based on the third access frame and a portion of the fourth access frame. The method includes comparing the second error code bits to the third error code bits; and verifying read data if the second error code bits match the third error code bits.

In other features, the method includes comparing the second error code bits to the third error code bits; and discarding read data if the second error code bits do not match the third error code bits.

A method for operating a serial management interface for a slave device includes receiving a first access frame from a serial management interface master device via an input/output pin and writing data to a first one of the plurality of registers based on the first access frame; and receiving a second access frame from the serial management interface master device on the input/output pin including first error code bits based on the first access frame.

In other features, the first error code bits are further based on a portion of the second access frame. The first access frame and the second access frame received by the serial management interface slave device have a frame format compliant with one of Clause 22 and Clause 45 of IEEE 802.3-2018. The method includes generating second error code bits based on the first access frame and a portion of the second access frame.

In other features, the method includes comparing the first error code bits to the second error code bits. The method includes writing a second one of the plurality of registers with data from the first access frame if the first error code bits match the second error code bits. The method includes discarding the first access frame and the second access frame if the first error code bits do not match the second error code bits. The method includes receiving a third access frame to read data from a third one of the plurality of registers and a fourth access frame to read at least one of error code bits and status bits from fourth and fifth ones of the plurality of registers. The method includes receiving a third access frame from the serial management interface master device and outputting the second error code bits.

A method for operating a serial management interface for a master device includes selecting a first read/write mode and a second read/write mode. In the first read/write mode, the method includes writing data to a serial management interface slave device and reading data from the serial management interface slave device connected to an input/output pin by generating write and read access frames, without verification using error code bits, using a frame format that is compatible with a first clause and a second clause of a serial management interface protocol. In the second read/write mode, the method includes writing data to and reading data from the serial management interface slave device connected to the input/output pin using the first clause and the second clause of the serial management interface protocol with verification by generating write and read access frames and additional access frames that include error code bits and that have a frame format that is compliant with at least one of the first clause and the second clause of the serial management interface protocol.

In other features, the first clause corresponds to Clause 22 of IEEE 802.3-2018 and the second clause corresponds to Clause 45 of IEEE 802.3-2018.

A method for operating a serial management interface of a master device includes causing write data to be written to a serial management interface slave device and read data to be read from the serial management interface slave device connected to the input/output pin in compliance with a first clause of a serial management interface protocol including at least one of a write access frame including both write data and a write address, and a write error code access frame including error code bits based on the write access frame and a portion of the write error code access frame; and a read access frame including both read data and a read address and a read error code access frame including error code bits based on the read access frame and a portion of the read error code access frame.

In other features, the method includes writing data to the serial management interface slave device and reading data from the serial management interface slave device connected to the input/output pin in compliance with a second clause of the serial management interface protocol including at least one of first and second access frames including a write address and write data, respectively, and first and second error code access frames including a write error code address and write error code, respectively; and third and fourth access frames including a read address and read data, respectively, and third and fourth error code access frames including a read error code address and read error code, respectively.

In other features, the write error code is based on the first access frame, the second access frame, the first error code access frame, and a portion of the second error code access frame. The read error code is based on the third access frame, the fourth access frame, the third error code access frame, and a portion of the fourth error code access frame.

In other features, the first clause corresponds to Clause 22 of IEEE 802.3-2018 and the second clause corresponds to Clause 45 of IEEE 802.3-2018. The method includes causing write data to be written to the serial management interface slave device and read data to be read from the serial management interface slave device connected to the input/output pin using a hybrid protocol that is based on both the first clause and the second clause of the serial management interface protocol.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

FIG. 7 is an example of a series of access frames for Reliable Read Access over Clause 22 according to the present disclosure.

FIG. 8 is an example of a series of access frames for Reliable Write Access over Clause 45 according to the present disclosure.

FIG. 9 is an example of a series of access frames for Reliable Read Access over Clause 45 according to the present disclosure.

FIG. 10 is an example of a series of access frames for Hybrid Reliable Write Access according to the present disclosure.

In the drawings, reference numbers may be reused to identify similar and/or identical elements.

DESCRIPTION

Systems and methods according to the present disclosure check the correctness of serial management interface (SMI) read and write accesses using error code bits. As described above, interference may affect the bit stream transferred on the MDIO pin (and/or a clock signal transferred on the MDC pin). The techniques described herein are suitable for use in noisy environment such as within automotive vehicles or noisy industrial environments. The interference may cause an access protocol, access type, address and/or data to be incorrect. Severe consequences may occur if a critical register is configured incorrectly or the SMI master is misled by incorrect read data.

Existing SMI devices cannot self-verify the read and write accesses since error code bits cannot be added to the access frames without causing noncompliance with Clause 22 and 45 of IEEE 802.3-2018, which is hereby incorporated by reference herein in its entirety. Systems and methods described herein use error code bits sent in additional access frames to verify the access to improve reliability while maintaining backwards compatibility and compliance with Clause 22 and 45.

In some examples, the error code (EC) bits may include cyclic redundancy check (CRC) bits such as an 8-bit, 16-bit or 32-bit CRC. However, other types of error codes, CRC, or parity bits can be used. In some examples, one or multiple accesses are used to transfer error code bits for a single read or write access.

Figure 1:
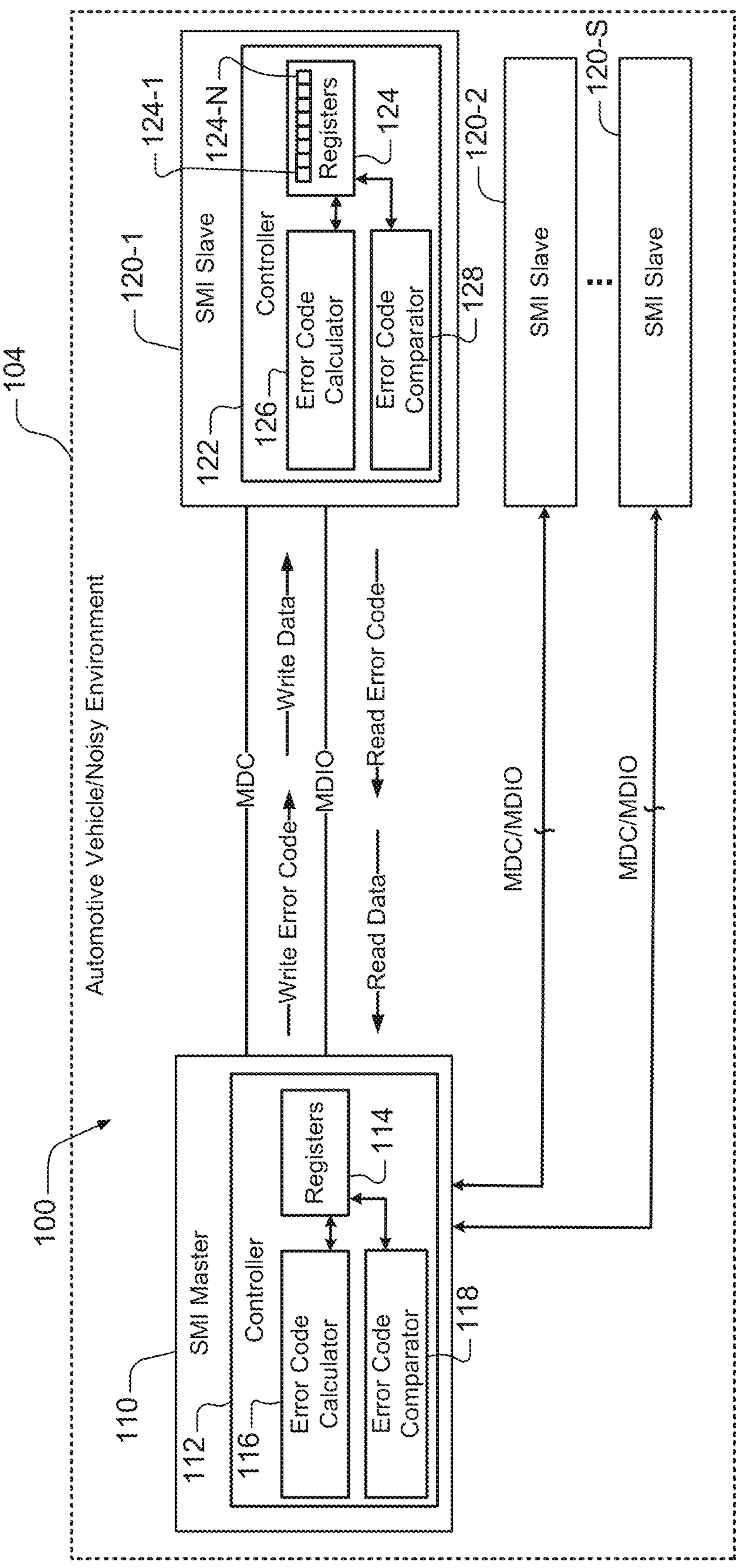
FIG. 1 is a functional block diagram of an example of a serial management interface according to the present disclosure.

FIG. 1 shows a serial management interface 100 including an SMI master 110 including a controller 112. In the depicted embodiment, the serial management interface is disposed in a relatively electromagnetically noisy environment 104 such as an automotive vehicle, industrial facility or the like which may be predisposed to corrupting the transfer of digital signals. Although the depicted embodiments are particularly suitable for use in noisy environments, they can be deployed in other less noisy environments as well. The controller 112 includes registers 114, an error code calculator 116 and an error code comparator 118. One or more SMI slaves 120-1, 120-2, . . . , and 120-S (individually or collectively referred to as SMI slave 120 or SMI slaves 120) (where S is an integer greater than zero) include a controller 122. The controller 122 also includes registers 124-1, 124-2, . . . and 124-N (where N is an integer greater than one) (collectively and/or individually registers 124), an error code calculator 126 and an error code comparator 128. The SMI master 110 and the SMI slave 120 communicate via corresponding MDC and MDIO pins. The SMI master 110 reliably writes data to the SMI slave 120 using SMI compliant frames including error code as will be described further below. The SMI slave 120 reliably transmits data to the SMI master 110 using SMI compliant frames including error code as will be described further below.

To simplify the design, additional SMI access frames are used to transfer the error code information instead of using an additional interface. In some examples, systems and methods described below calculate error code bits from the transferred bit stream between the SMI master 110 and the SMI slave 120 and transfer the error code bits to the SMI master 110 or the SMI slave 120 (depending on the access type) through an additional SMI access to check the correctness of a prior SMI access. The SMI access for transferring the error code bits complies with Clause 22 or Clause 45 of IEEE Standard 802.3-2018.

For example, an SMI access is performed to write EC bits to the SMI slave 120 after transmitting the normal SMI access frame for writing data to the register 124. In some examples, an SMI access is performed to read EC bits from the SMI slave 120 after the normal SMI access for reading data from the register 124.

The SMI slave 120 holds the normal SMI access (for writing data to a register) until the EC bits from the SMI master 110 are sent in the additional SMI access frame. The SMI slave 120 calculates EC bits based on the transferred bit stream (and part of bit stream in the second access for transferring EC bits) and compares the bits to the EC bits received from the SMI master 110. If the two sets of EC bits match, the normal SMI access will be released by the SMI slave 120 to an internal management (MGMT) bus. Otherwise, the normal SMI access frame will be discarded.

The SMI slave 120 does not hold the normal SMI access when reading data from a register. However, the SMI slave 120 calculates the EC bits based on the transferred bit stream. If the SMI master 110 verifies the read data, an additional SMI access can be issued by the SMI master 110 to read the EC bits from the SMI slave 120. The SMI master 110 calculates the EC bits based on the transferred bit stream and compares the bits to the received EC bits. If two sets of EC bits match, the read data is correct. Otherwise, the SMI master 110 discards the read data and performs the read access again.

The EC bits are calculated by both the SMI master 110 and the SMI slave 120 when transferring to each other to verify the write and read access. The EC bits are transferred between the SMI slave 120 and the SMI master 110 through SMI access targeted to the reliable access EC register as will be described further below.

Transferring EC bits from the SMI master 110 to the SMI slave 120 is performed through SMI write access (referred to as EC write). Transferring EC bits from the SMI slave 120 to the SMI master 110 is through SMI read access (referred to as EC read). EC write and EC read are collectively referred to as EC access.

In some examples, the bit stream of EC access can follow the protocol defined in Clause 22 of IEEE Standard 802.3-2018. The bit stream of EC write follows the WRITE frame format and the bit stream of EC read follows the READ frame format. The two frame formats are defined in Clause 22 of IEEE Standard 802.3-2018.

FIGS. 2-5 show additional access frames including error code bits that are sent during reading and writing under Clause 22 and 45. The access frames including error code bits (or addresses and error code bits) are sent after the prior read or write access frames that comply with Clause 22 and 45. FIGS. 6-11 show additional examples of reliable access with both the write or read access frames and the error code access frames. As can be appreciated, the serial management interface does not explicitly support the use of error codes.

Figure 2:
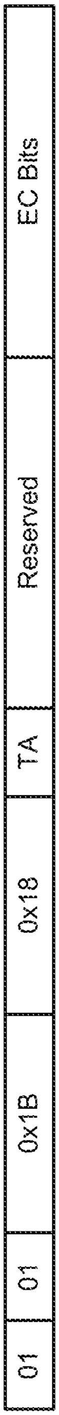
FIG. 2 is an example of an access frame for EC write over Clause 22 according to the present disclosure.

FIG. 2 shows a bit stream of EC write over Clause 22 (referred to as Clause 22: EC write). The bit stream (other than TA) is driven by the SMI master 110 to the SMI slave 120. TA indicates the turnaround period defined in Clause 22. Rather than sending data, the EC bits are sent as part of the payload.

Figure 3:
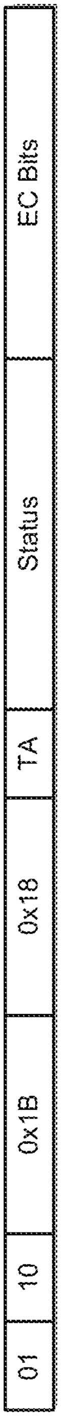
FIG. 3 is an example of an access frame for EC Read over Clause 22 according to the present disclosure.

FIG. 3 shows the bit stream of EC read over Clause 22 (referred to as Clause 22: EC read). The bit stream (other than TA, Status and EC bits) are driven by the SMI slave 120 back to the SMI master 110. Status bits include the status of reliable access described below. Rather than sending data, status (described further below) and EC bits are sent as part of the payload.

In other examples, the bit stream of EC access also follows the protocol defined in Clause 45 of IEEE Standard 802.3-2018. Under Clause 45, two consecutive SMI accesses are used for both EC write and EC read. One access sets up the address targeted to EC register (referred to as EC address write) and another access writes EC bits to the SMI slave 120 (referred to as EC data write) or reads EC bits from the SMI slave 120 (referred to as EC data read). The bit stream of EC address write follows the address frame format. The bit stream of EC data write follows the write frame format. The bit stream of EC data read follows the read frame format. These frame formats are defined in Clause 45 of IEEE Standard 802.3-2018.

Figure 4:
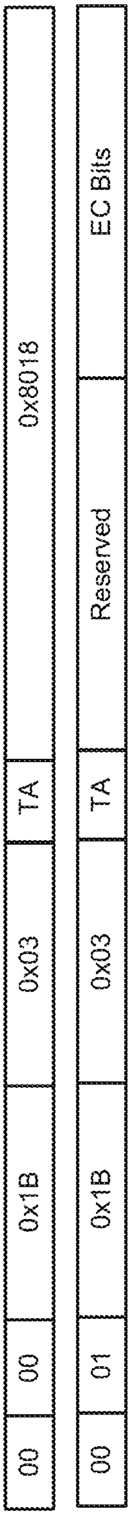
FIG. 4 is an example of a series of access frames for EC Write over Clause 45 according to the present disclosure.

FIG. 4 shows the bit stream of EC write over Clause 45 (referred to as Clause 45: EC write). The first access is EC address write for setting the address targeted to EC register (referred to as Clause 45: EC address write). The second access is EC data write for writing EC bits to the SMI slave 120 (referred to as Clause 45: EC data write). The bit stream (other than TA) is driven by the SMI master 110 to the SMI slave 120. TA indicates the turnaround period defined in Clause 45.

Figure 5:
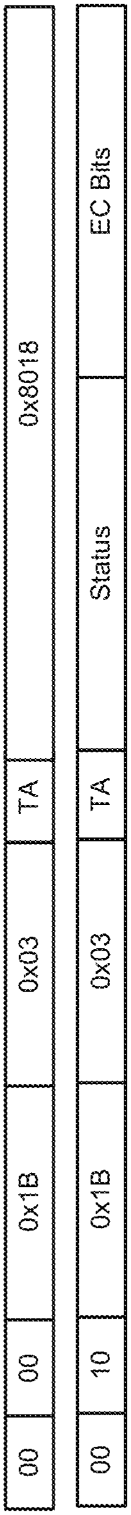
FIG. 5 is an example of a series of access frames for EC Read over Clause 45 according to the present disclosure.

FIG. 5 shows the bit stream of EC read over Clause 45 (referred to as Clause 45: EC read). The first access is a EC address write for setting the address targeted to EC register. The second access is EC data read for reading status bits and EC bits from the SMI slave 120 (referred to as Clause 45: EC data read). The bit stream with status and EC bits is driven by the SMI slave 120 back to the SMI master 110.

The write access (excluding the write access for transferring EC bits) is followed by EC bits for the SMI slave 120 to verify the correctness of write access. The read access (excluding the read access for transferring EC bits) can have EC bits that are read out for the SMI master 110 to verify the correctness of read access.

In some examples, reliable access is disabled by default for backward compatibility. If disabled, write accesses will be released to internal management (MGMT) bus without EC verification. If disabled, EC write accesses will be discarded by the SMI slave 120 and EC read accesses will have unknown data returned. This feature can be enabled or turned off by writing the zero to a programmable register bit.

Figure 6:
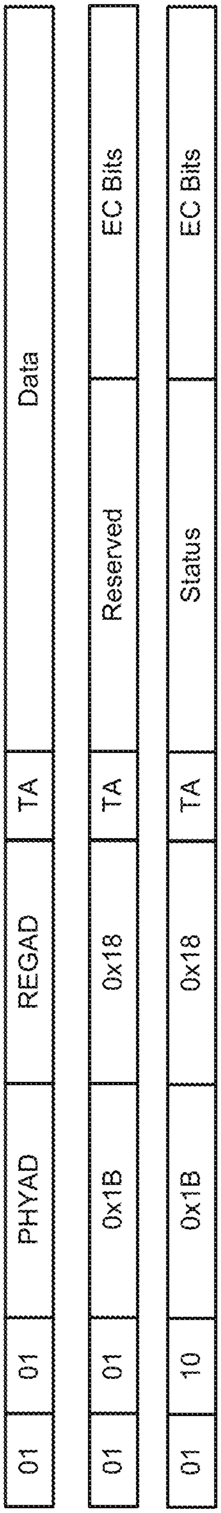
FIG. 6 is an example of a series of access frames for Reliable Write Access over Clause 22 according to the present disclosure.

Clause 22 of IEEE Standard 802.3-2018 defines two kinds of accesses: write data (referred to as Clause 22: WRITE) and read data (referred to as Clause 22: READ). FIG. 6 shows the sequence of reliable write access over Clause 22. The first access is Clause 22: WRITE for writing data to the register. The second access is Clause 22: EC WRITE for writing EC bits to the SMI slave 120 for the SMI slave 120 to verify a prior Clause 22: WRITE. The third access is Clause 22: EC read for reading out the status bits for the SMI master 110 to check the result of a prior Clause 22: WRITE. The EC bits in the third access are used to verify the correctness of this EC read. The third access can be skipped if the SMI master 110 does not need to check the result.

FIG. 7 shows the sequence of reliable read access over Clause 22. The first access is Clause 22: READ for reading data from the register identified in the frame. The second access is Clause 22: EC read for reading EC bits from the SMI slave 120 for the SMI master 110 to verify a prior Clause 22: READ.

Clause 45 of IEEE Standard 802.3-2018 defines four kinds of accesses: write address (referred to as Clause 45: Address), write data (referred to as Clause 45: Write), read data (referred to as Clause 45: Read) and read data with incrementing address (referred to as Clause 45: Post-read-increment-address).

According to the protocol of Clause 45, the address of target register is transferred in an access (Clause 45: Address) instead of along with the data written to or read from the target register. Generally, the writing or reading of the register are performed by a sequence that sets the address through Clause 45: Address and then accesses the targeted register through Clause 45: Write or Clause 45: Read or Clause 45: Post-read-increment-address. Since the address in Clause 45: Address is stored in the SMI slave 120, the register can also be accessed without a prior Clause 45: Address if the stored address is desired.

FIG. 8 shows the sequence of reliable write access over Clause 45. The first access is Clause 45: Address for setting the address targeted to the register (this address is stored in the SMI slave 120 anyway). This access can be skipped if the stored address in the SMI slave 120 is desired. The second access is Clause 45: Write for writing data to the register. The third and fourth access are Clause 45: EC write for writing EC bits to the SMI slave 120 for the SMI slave 120 to verify a prior Clause 45: Address (if issued) and Clause 45: Write. The fifth and sixth access are Clause 45: EC read for reading out status bits for the SMI master 110 to check the result of a prior Clause 45: Address (if issued) and Clause 45: Write. The EC bits in the sixth access are used to verify the correctness of this EC read. The fifth and sixth access can be skipped if the SMI master 110 does not need to check the result if the status bits, already been read by the SMI master 110, are sufficient.

FIG. 9 shows the sequence of reliable read access over Clause 45. The first access is Clause 45: Address for setting the address targeted to the register (this address is stored in the SMI slave 120 anyway). This access can be skipped if the stored address in the SMI slave 120 is desired. The second access is Clause 45: Read or Clause 45: Post-read-increment-address for reading data from the register. The third and fourth access are Clause 45: EC read for reading EC bits from the SMI slave 120 for the SMI master 110 to verify a prior Clause 45: Address (if issued) and Clause 45: Read or Clause 45: Post-read-increment-address.

Clause 45: EC access includes a Clause 45: EC address write that sets the address targeted to EC register. The SMI slave 120 adds logic to prevent the stored address from being updated from the address in Clause 45: EC address write. Clause 45: EC address write are used to indicate next Clause 45: Write or Clause 45: Read is Clause 45: EC data write or Clause 45: EC data read. Any of Clause 45: Write and Clause 45: Read (for transferring EC bits) issued without a prior Clause 45: EC address write will be treated as first access of the reliable access.

As compared to Clause 22: EC access, Clause 45: EC access includes one more SMI access. To reduce the number of SMI accesses, Clause 22: EC access can be used to verify the SMI access over Clause 45.

FIG. 10 shows the sequence of hybrid reliable write access. The write access is hybrid since it uses Clause 45 for part of the access and clause 22 for the other part of the write access. The first access is Clause 45: Address for setting the address targeted to the register (this address is stored in the SMI slave 120 anyway). This access can be skipped if the stored address in the SMI slave 120 is desired. The second access is Clause 45: Write for writing data to the register. The third access is Clause 22: EC write for writing EC bits to the SMI slave 120 for the SMI slave 120 to verify a prior Clause 45: Address (if issued) and Clause 45: Write. The fourth access is Clause 22: EC read for reading out the status bits for the SMI master 110 to check the result of a prior Clause 45: Address (if issued) and Clause 45: Write. The EC bits in the fourth access are used to verify the correctness of this EC read. The fourth access can be skipped if the SMI master 110 does not need to check the result.

Figure 11:
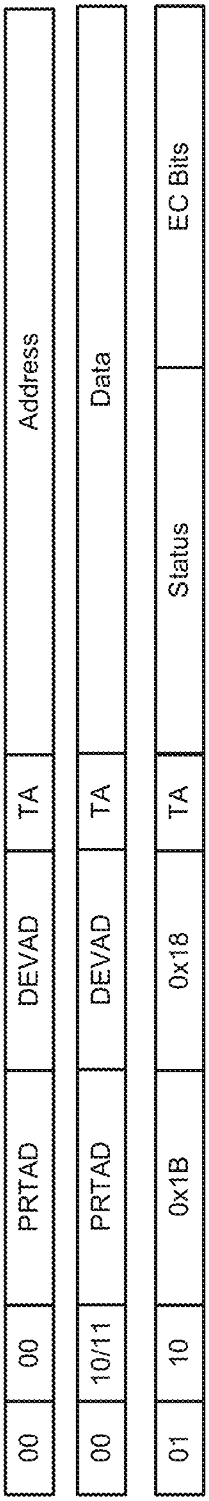
FIG. 11 is an example of a series of access frames for Hybrid Reliable Read Access according to the present disclosure.

FIG. 11 shows the sequence of hybrid reliable read access. The read access is hybrid since it uses Clause 45 for part of the access and clause 22 for the other part of the read access. The first access is Clause 45: Address for setting the address targeted to the register (this address is stored in the SMI slave 120 anyway). This access can be skipped if the stored address in the SMI slave 120 is desired. The second access is Clause 45: Read or Clause 45: Post-read-increment-address for reading data from the register. The third access is Clause 22: EC read for reading EC bits from the SMI slave 120 for the SMI master 110 to verify a prior Clause 45: Address (if issued) and Clause 45: Read or Clause 45: Post-read-increment-address.

Any access (include EC access) that violates the reliable access sequence defined in FIGS. 6 to 11 will reset the sequence. The violated Clause 22: WRITE, Clause 22: READ, Clause 45: Address, Clause 45: Write, Clause 45: Read and Clause 45: Post-read-increment-address will be treated as first access of reliable access. The violated Clause 22: EC write and Clause 45: EC write will be discarded. The violated Clause 22: EC read and Clause 45: EC read will have status bits and EC bits been read out.

The address in Clause 45: Address is stored in the SMI slave 120 (at the address indicated in the access frame) regardless of the result of EC verification. If the reliable access over Clause 45 or hybrid reliable access fails, the SMI master 110 re-issues Clause 45: Address to update the address in the SMI slave 120 because the stored address might by corrupt if a prior Clause 45: Address is altered due to interference. If non Clause 45: Address is interfered into a Clause 45: Address, then the address stored in the SMI slave 120 will be updated. The SMI master 110 identifies when the address stored in the SMI slave 120 might by corrupt if reliable access fails (even Clause 45: Address is not issued).

The EC bits for verifying write access are generated by the SMI master 110 and verified by the SMI slave 120. The EC bits for verifying read access are generated by the SMI slave 120 and verified by the SMI master 110. The generation and verification of EC bits use the same algorithm calculated on the same portion of transferred bit steam.

Each reliable write access over Clause 22 involves 2 accesses (plus 1 access if the status bits need to be checked) including 8 octets (plus 4 octets if the status bits need to be checked) transferred through SMI. Each reliable read access over Clause 22 involves 2 accesses consisted of 8 octets transferred through SMI.

Figure 12:
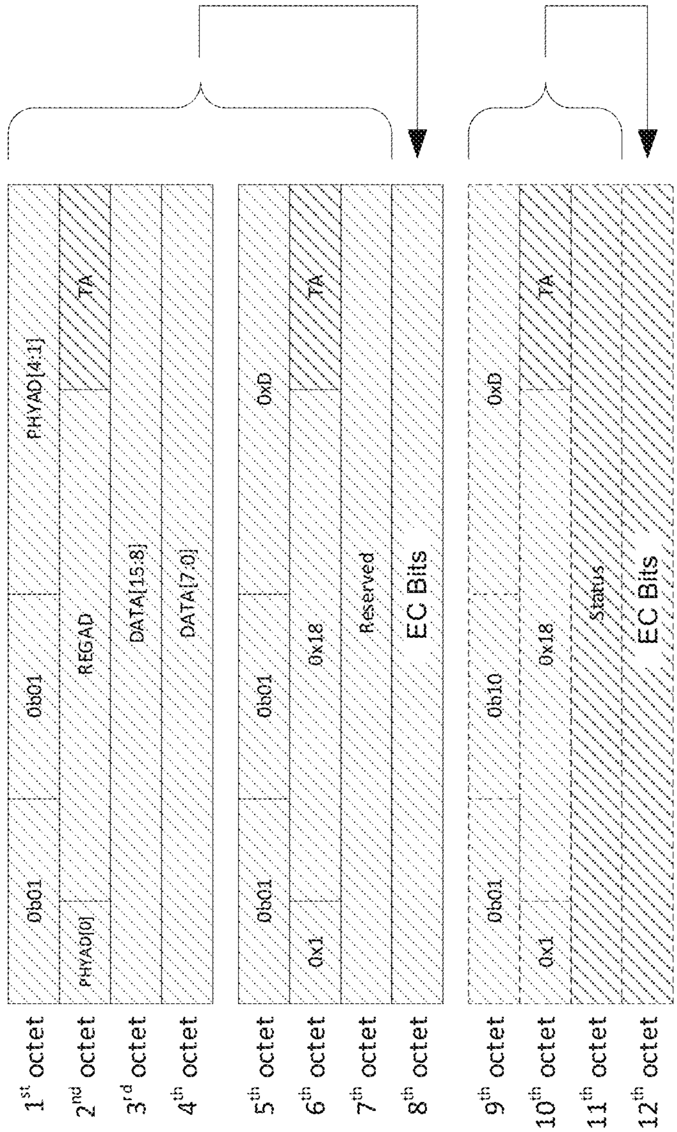
FIG. 12 is an example of a series of octets for EC Calculation for Reliable Write Access over Clause 22 according to the present disclosure.

FIG. 12 shows the octets in reliable write access over Clause 22 for EC calculation. TA bits are replaced by 2-bits zero when performing the calculation. The value in the reserved field depends on the SMI master 110. The EC bits in eighth octet are calculated from first to seventh octets by the SMI master 110 and verified by the SMI slave 120. The EC bits in the 12th octet are calculated from ninth to eleventh octets by the SMI slave 120 and verified by the SMI master 110.

Figure 13:
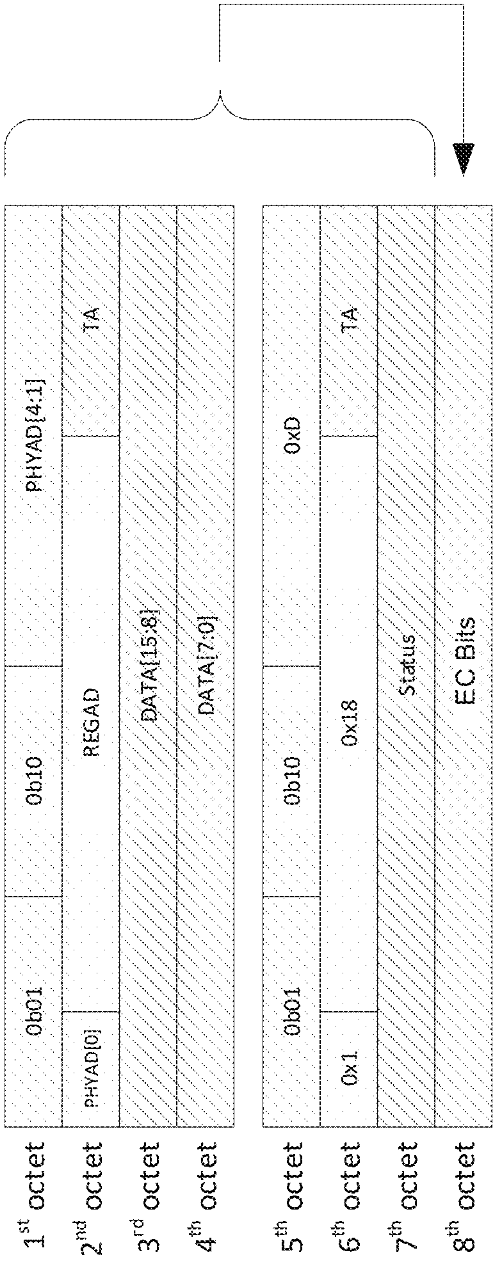
FIG. 13 is an example of a series of octets for EC Calculation for Reliable Read Access over Clause 22 according to the present disclosure.

FIG. 13 shows the octets in reliable read access over Clause 22 for EC calculation. TA is replaced by 2-bits zero when performing the calculation. The EC bits in the eighth octet are calculated from first to seventh octets by the SMI slave 120 and verified by the SMI master 110.

Each reliable write access over Clause 45 includes 3 accesses (plus 1 access if Clause 45: Address is issued and plus 2 accesses if need to check status bits) including 12 octets (plus 4 octets if Clause 45: Address is issued and plus 8 octets if need status bits are checked) transferred through SMI. Each reliable read access over Clause 45 includes 3 accesses (plus 1 access if Clause 45: Address is issued) consisted of 12 octets (plus 4 octets if Clause 45: Address is issued) transferred through SMI.

Figure 14:
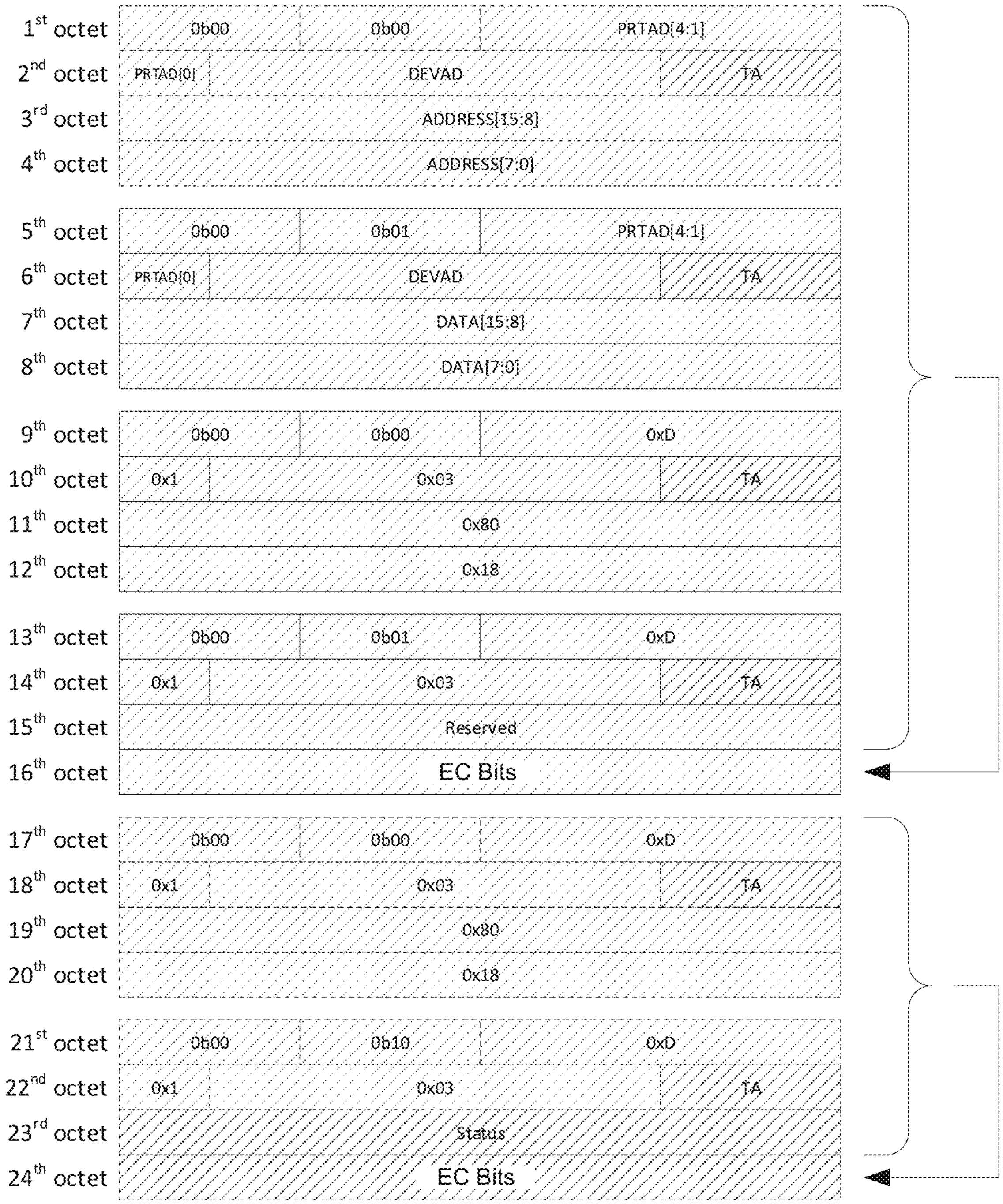
FIG. 14 is an example of a series of octets for EC Calculation for Reliable Write Access over Clause 45 according to the present disclosure.

FIG. 14 shows the octets in reliable write access over Clause 45 for EC calculation. TA is replaced by 2-bits zero when performing the calculation. The value in the reserved field depends on the SMI master 110. The EC bits in sixteenth octet is calculated from first to fifteenth octets by the SMI master 110 and verified by the SMI slave 120. The EC bits in the 24th octet are calculated from 17th to 23rd octets by the SMI slave 120 and verified by the SMI master 110.

Figure 15:
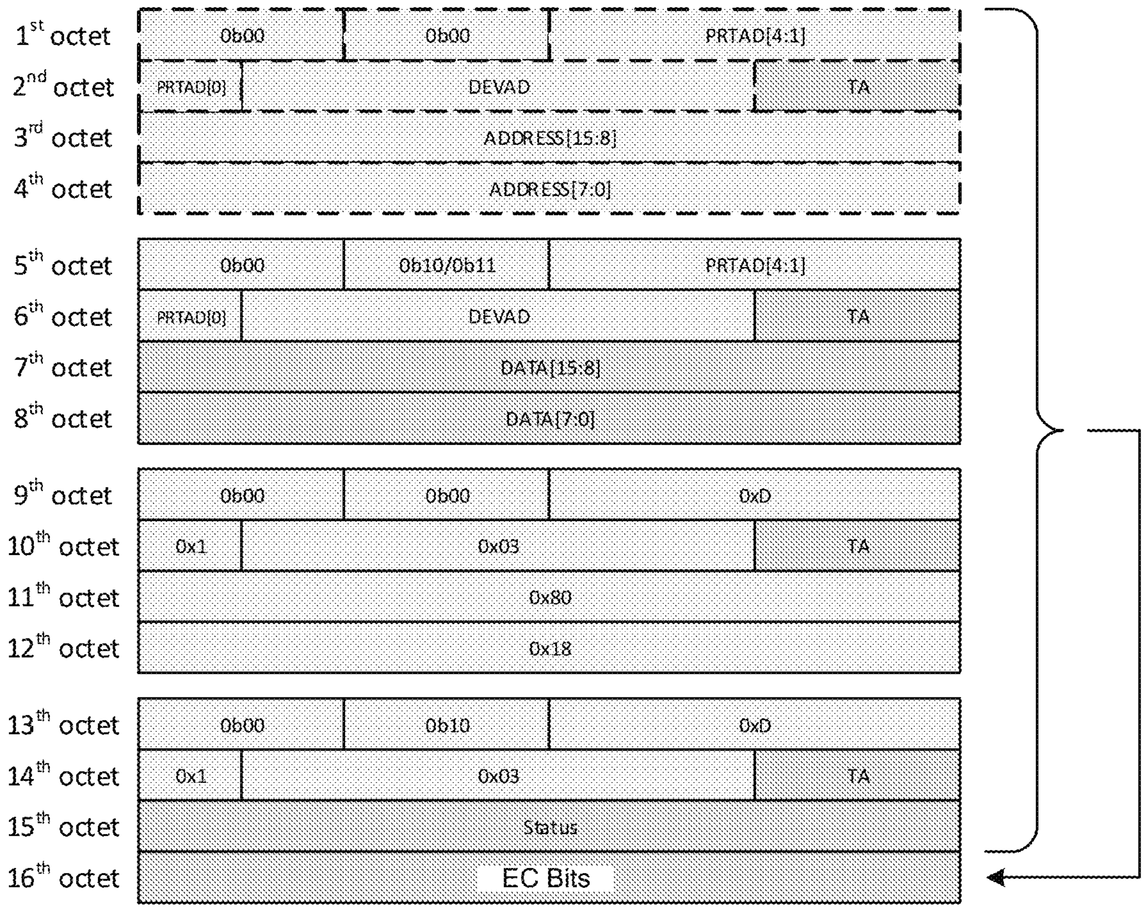
FIG. 15 is an example of an access frame for EC Calculation for Reliable Read Access over Clause 45 according to the present disclosure according to the present disclosure.

FIG. 15 shows the octets in reliable read access over Clause 45 for EC calculation. TA is replaced by 2-bits zero when performing the calculation. The EC bits in the 16th octet are calculated from 1st to 15th octets by the SMI slave 120 and verified by the SMI master 110.

Each hybrid reliable write access includes 2 accesses (plus 1 access if Clause 45: Address is issued and plus 1 access if the status bits are checked) includes 8 octets (plus 4 octets if Clause 45: Address is issued and plus 4 octets if the status bits are checked) transferred through SMI. Each hybrid reliable read access includes 2 accesses (plus 1 access if Clause 45: Address is issued) consisted of 8 octets (plus 4 octets if Clause 45: Address is issued) transferred through SMI.

Figure 16:
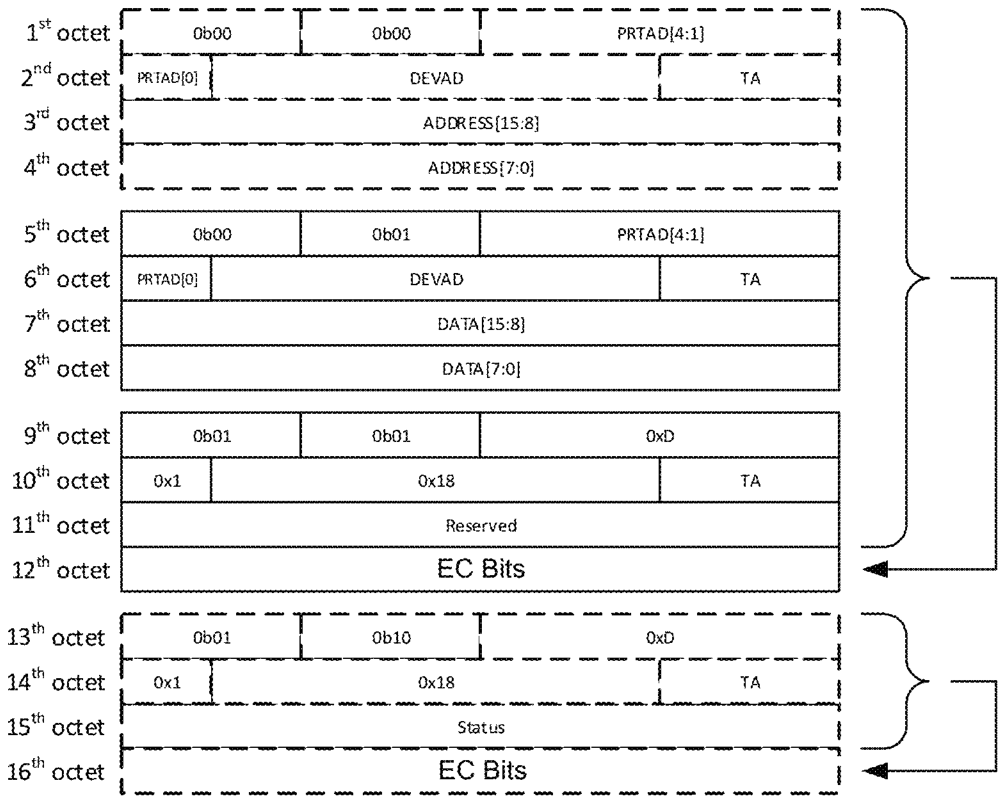
FIG. 16 is an example of a series of octets for EC Calculation for Hybrid Reliable Write Access according to the present disclosure.

FIG. 16 shows the octets in hybrid reliable write access for EC calculation. TA is replaced by 2-bits zero when performing the calculation. The value in the reserved field depends on the SMI master 110. The EC bits in 12th octet are calculated from the first to eleventh octets by the SMI master 110 and verified by the SMI slave 120. The EC bits in the sixteenth octet are calculated from 13th to 15th octets by the SMI slave 120 and verified by the SMI master 110.

Figure 17:
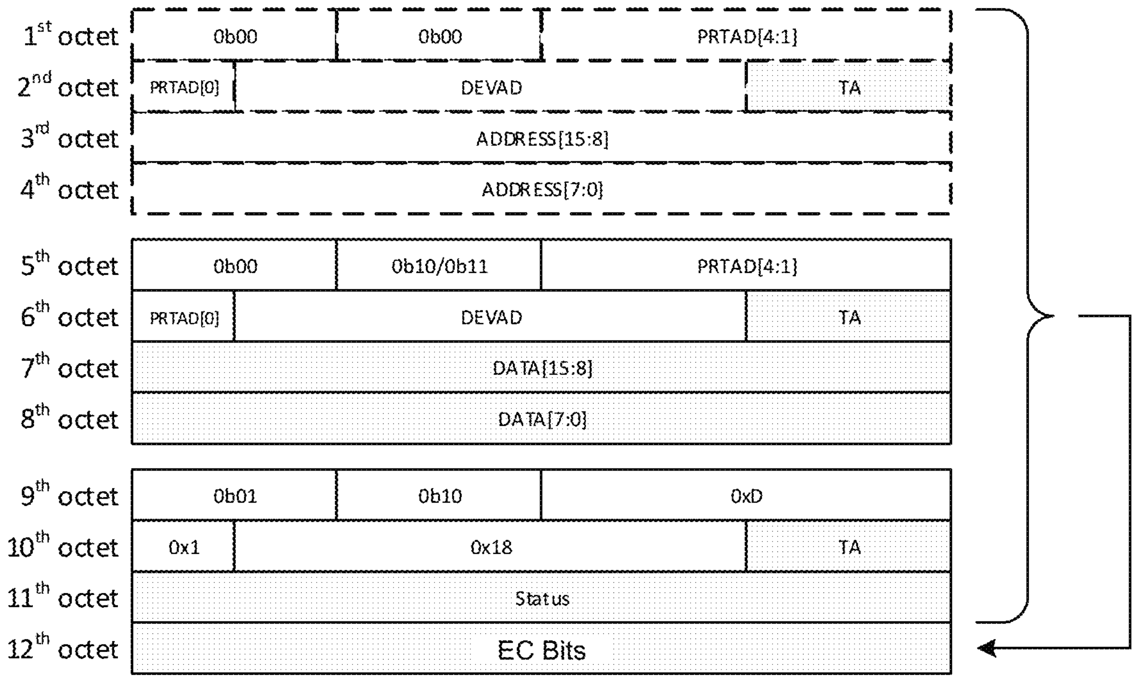
FIG. 17 is an example of EC Calculation for Hybrid Reliable Read Access according to the present disclosure.

FIG. 17 shows the octets in hybrid reliable read access for EC calculation. TA is replaced by 2-bits zero when performing the calculation. The EC bits in 12th octet are calculated from first to eleventh octets by the SMI slave 120 and verified by the SMI master 110.

For example, to generate EC including an 8-bit CRC, CRC-8 algorithm with below generator polynomial is selected:

$$G(x)=x^8+x^5+x^4+1$$

Mathematically, the CRC value corresponding to a given bit stream of SMI accesses is defined by the following procedure (same procedure defined in Clause 3 of IEEE Standard 802.3-2018 for MAC frame with exception of generator polynomial). The first 8 bits of the bit stream of SMI access are complemented. The n bits in the protected fields are then considered as the coefficients of a polynomial M(x) of degree n−1 (the first bit of the bit stream corresponds to $x^{(n-1)}$ term and the last of bit the bit stream (exclude CRC bits) corresponds to the $x^0$ term.) M(x) is multiplied by $x^8$ and divided by G(x), producing a remainder R(x) of degree≤7. The coefficients of R(x) are considered to be an 8-bit sequence. The bit sequence is complemented and the result is the EC bits.

The 8 bits of the EC value are placed in the 'EC Bits' field shown above so that the $x^7$ term is the left-most bit and the $x^0$ term is the right most bit. (The bits of the EC are thus transmitted in the order $x^7$, $x^6$, . . . , $x^1$, $x^0$.)

For reliable write access, the write access is not released to the internal management (MGMT) bus if the EC bits in the following EC write are incorrect. However, the SMI master 110 is not aware whether the write access was successful unless the SMI master 110 is read back from the targeted register to verify whether the data is written. The mechanism of read back has two disadvantages. Some registers may have some bits that have been updated by other logic instead of being written by write access. The SMI master 110 should be aware of this situation affecting for these registers if the SMI master 110 needs to write to these registers. The read back under reliable mode will need EC read to verify whether the read data is correct.

To provide more information, status bits are implemented to record the result of EC verification (pass or fail). If the status indicates pass, the write access is released to the internal MGMT bus successfully. Otherwise, the write access is not released to internal MGMT bus. The status is also implemented to record the type of access to indicate the type of a prior access (write access or read access).

The reading of the status bits is verified to make sure that the transfer of status bits is not corrupted. To save the register source, status bits are also placed on Reliable Access EC register and can be read out together with EC bits. According to the EC generation described above, the status bits can be verified by the EC bits.

In some examples, an 8-bit status is used: one bit is assigned to record the status of EC verification, two bits are assigned to record the type of access (EC access is excluded) and other bits are reserved for future use.

When any access (excluding EC access) is received, the status bit 5:4 is updated accordingly and the status bit 0 is cleared to 0. When EC write followed the write access is received, the status bit 0 is updated based on the result of EC verification.

Figure 18:
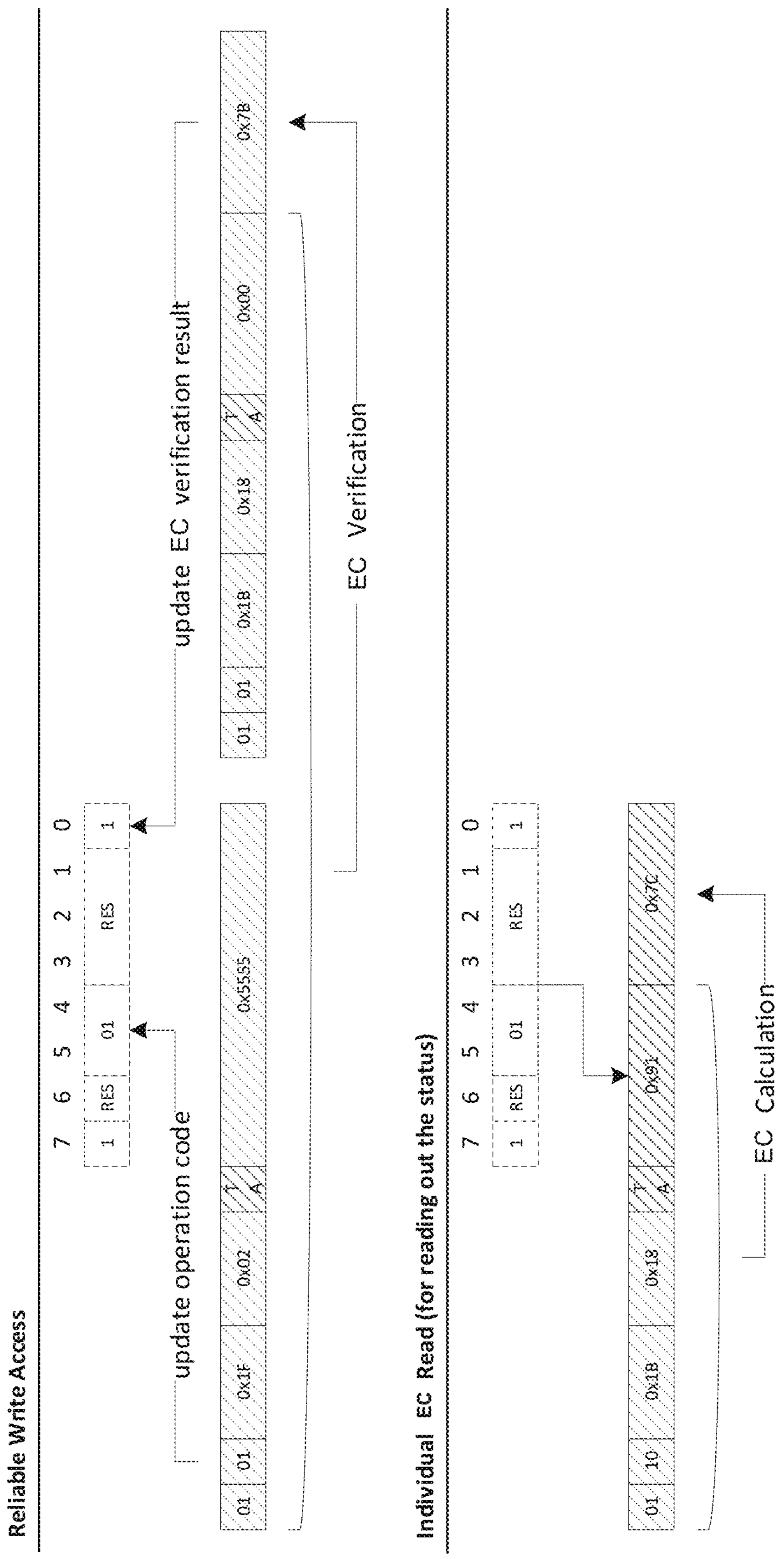
FIG. 18 illustrates updating and transferring of status bits according to the present disclosure.
Figure 19A:
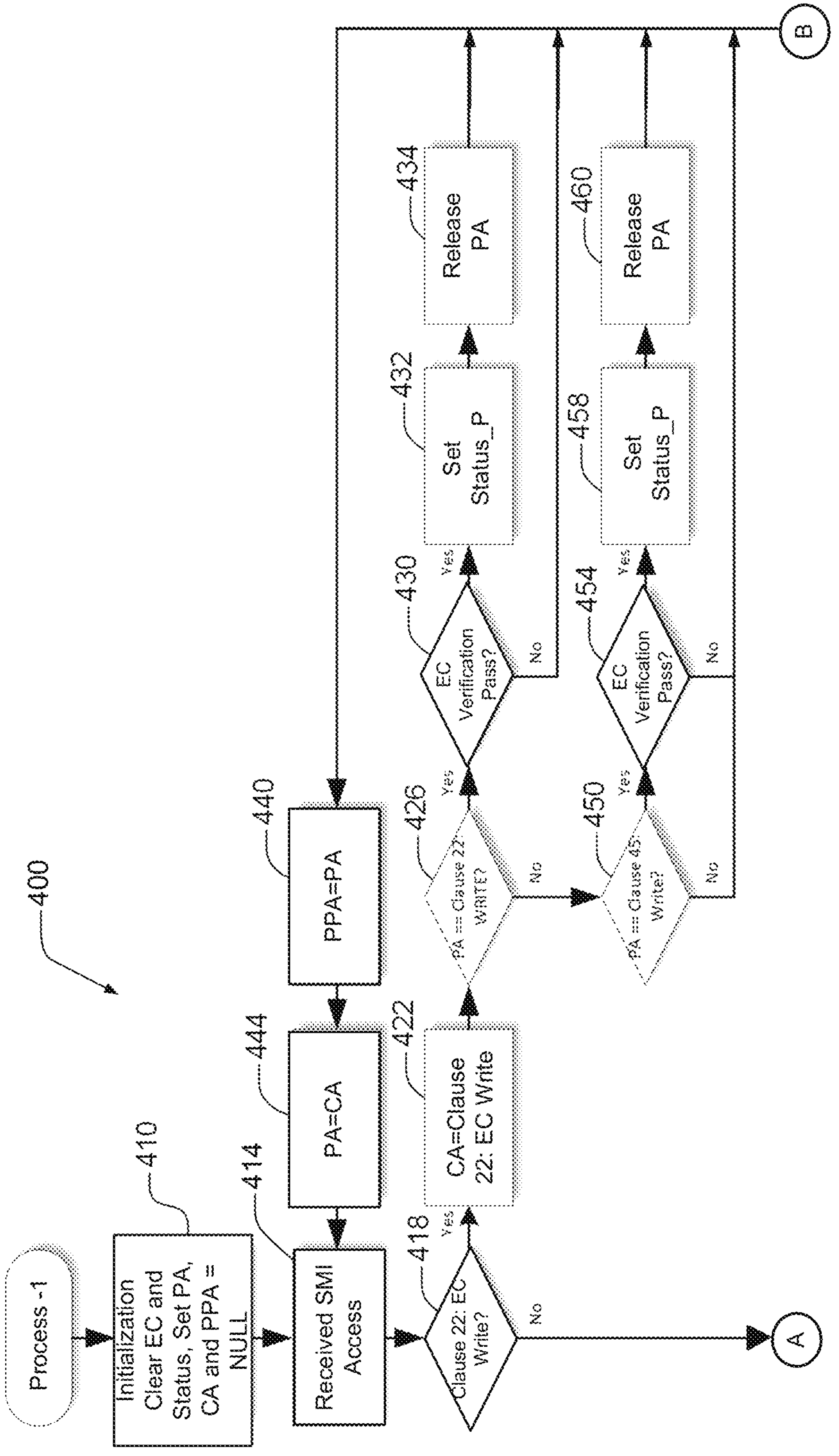
FIGS. 19A to 20B are flowcharts of an example method for Reliable Access according to the present disclosure.
Figure 19B:
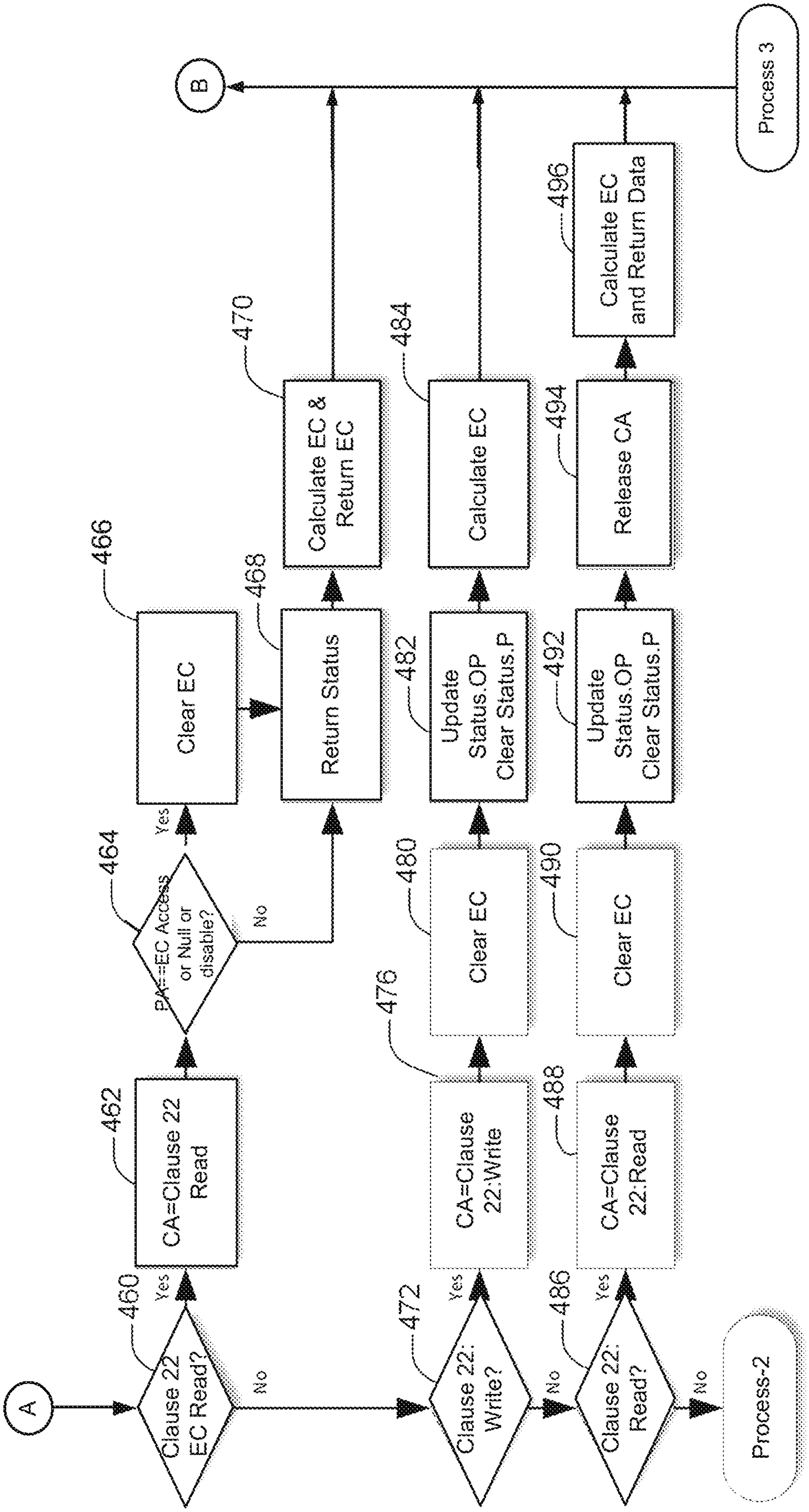

FIG. 18 shows an example of updating status bit during reliable write access over Clause 22 with correct EC bits and read out status bit followed by Clause 22: EC read. Status bits 5:4 are updated to 01 as the received access is Clause 22: WRITE. Status bit 0 is updated to 1 since the EC verification passed.

FIGS. 19A to 20B are flowcharts of a method 400 for reliable access for SMI. At 410, initialization performed and EC and status bits are cleared. A current access (CA) pointer, a prior access (PA) pointer and a previous prior access (PPA) pointer of the slave register are set to null. At 414, an SMI access is received. At 418, the method determines whether a Clause 22: EC write access is received. If 418 is true, the method sets CA=Clause 22: Write at 422. At 426, the method determines whether the PA==Clause 22:EC write. If 426 is true, the method determines whether the EC verification passed at 430. If 430 is true, the method sets the Status_P at 432 and releases the PA at 434. The method continues from 430 (if false) or 434 with 440 where PPA is set equal to PA. At 444, the method sets PA equal to CA.

If 426 is false (corresponding to a hybrid write), the method continues at 450 and determines whether PA==Clause 45: Write. If 450 is true, the method determines at 454 whether the EC verification passed. If 454 is true, the method sets the Status_P at 458 and releases the PA at 460. The method continues from 450 (if false), 454 (if false), or 460 with 440.

The method continues from 418 if false with 460. At 460, the method determines whether CA=Clause 22: EC Read access is received. If 460 (FIG. 19B) is true, the method continues at 462 and sets CA equal to Clause 22: EC Read. At 464, the method determines whether PA=EC Access or Null or the feature is disabled. If 464 is true, the method clears EC at 466 and returns status at 468. If 464 is false, the method returns status at 468. At 470, the method calculates EC and returns EC and then continues at 440.

If 460 is false, the method continues at 472 and determines whether Clause 22: Write access is received. If 472 is true, CA is set equal to Clause 22: Write at 476. At 480, the method clears EC. At 482, the method updates Status.OP and clears Status.P. At 484, the method calculates EC and then continues at 440.

If 472 is false, the method continues at 486. At 486, the method determines whether Clause 22: Read access is received. If 486 is true, the method sets CA equal to Clause 22: Read at 488. At 490, the method clears EC and updates Status.OP and clears Status.P at 492. At 494, the method releases CA. At 496, the method calculates EC and returns data and then returns to 440.

Figure 20A:
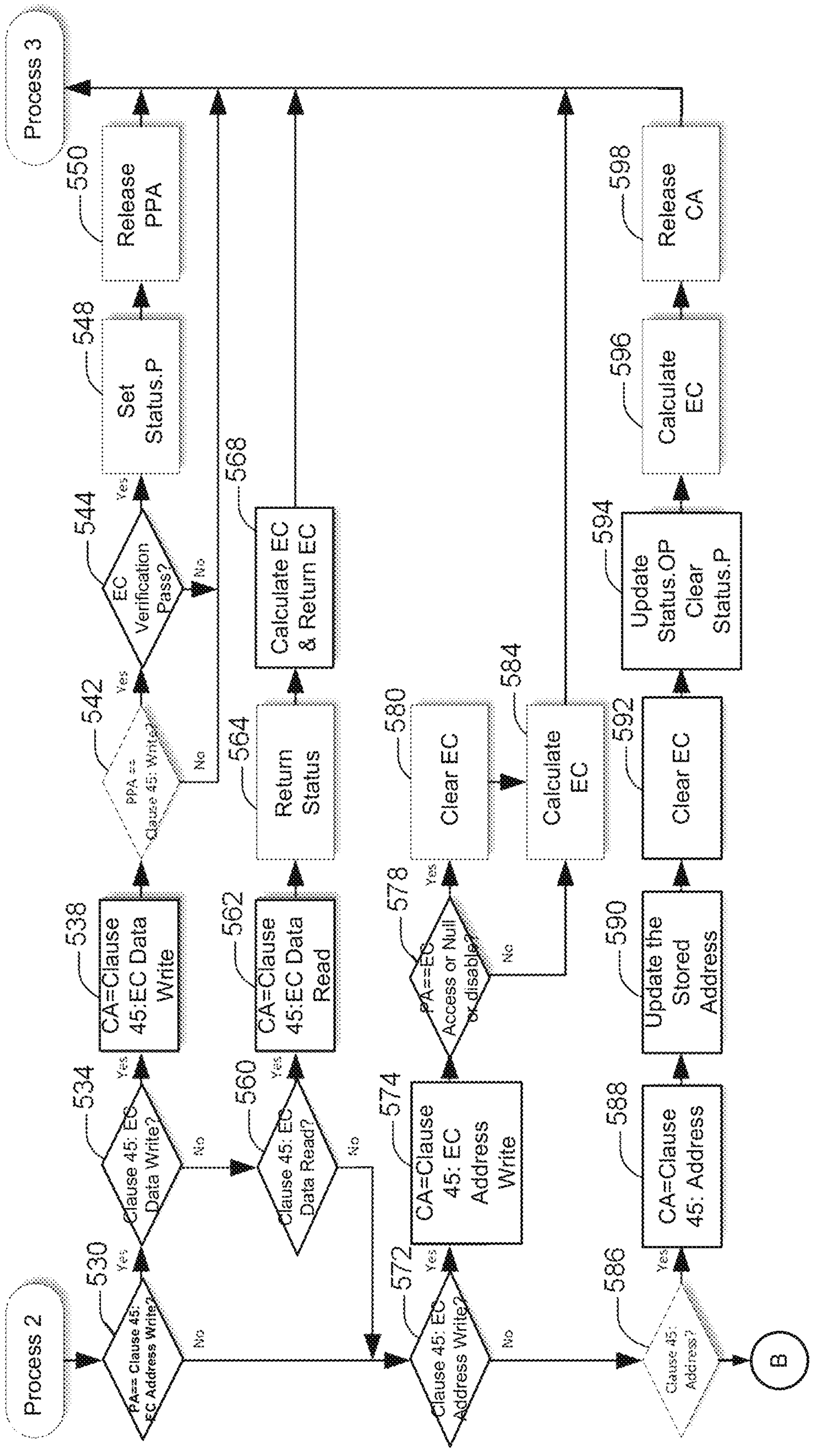
Figure 20B:
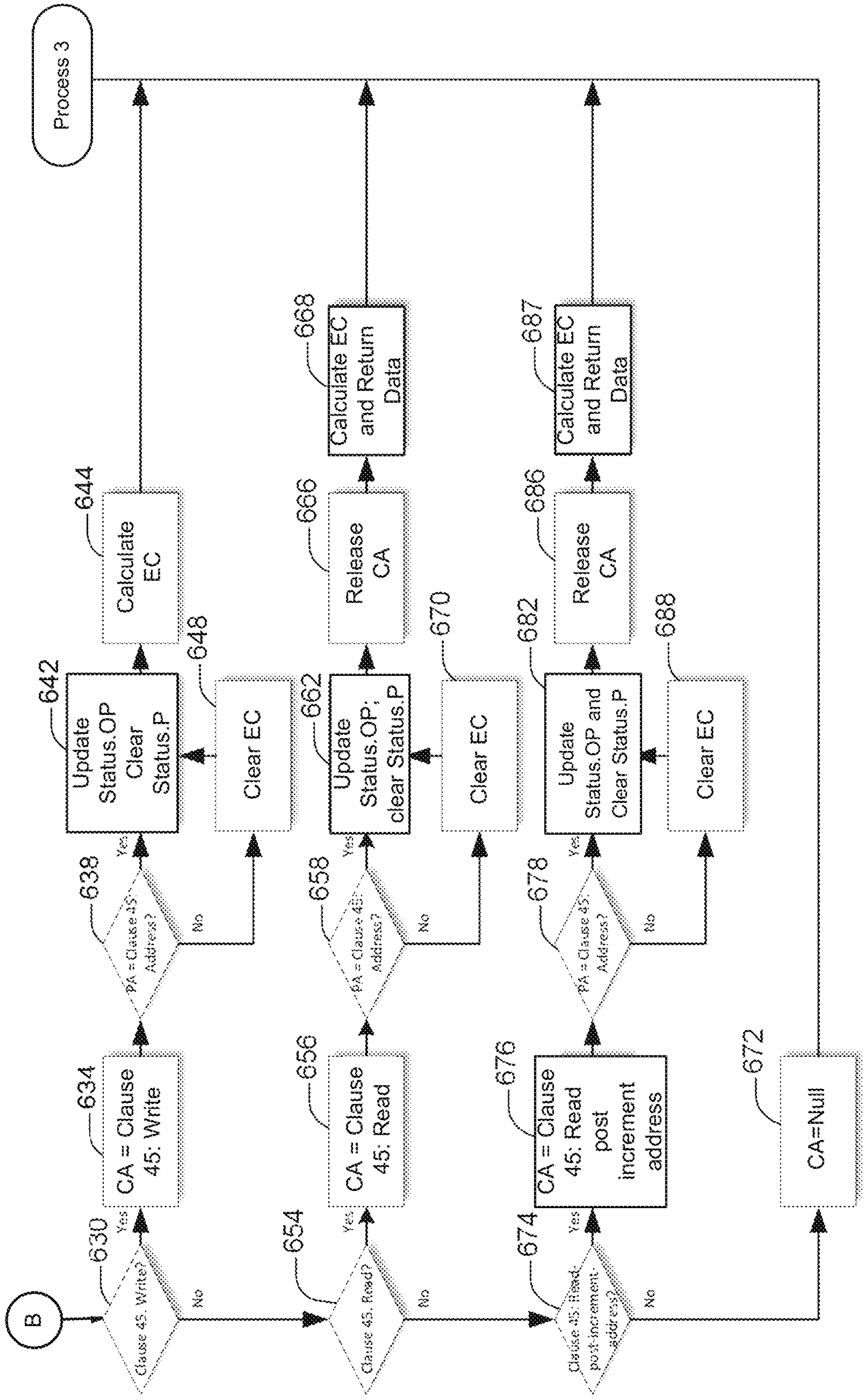

If 486 is false, the method continues with 530 (FIG. 20A). At 530, the method determines whether PA==Clause 45: EC Address Write. If 530 is true, the method continues at 534 and determines whether a Clause 45: EC Data Write access is received. If 534 is true, the method continues at 538 and sets CA equal to Clause 45: EC Data Write. At 542, the method determines whether PPA==Clause 45: Write. If 542 is true, the method continues at 544 and determines whether EC verification passed. At 548, the method sets Status.P and releases PPA at 550.

If 534 is false, the method continues at 560 and determines whether a Clause 45: EC Data Read access is received. If 560 is true, the method sets CA equal to Clause 45: EC Data Read at 562. At 564, the method returns status and at 568 the method calculates EC and returns EC. The method continues from 542 (if false), 544 (if false), 550 or 568 with 440.

The method continues from 530 (if false) or 560 (if false) with 572. At 572, the method determines whether a Clause 45: EC address write access is received. If 572 is true, the method continues at 574 and sets CA equal to Clause 45: EC Address Write. At 578, the method determines whether PA=EC Access or Null or the feature is disabled. If 578 is true, method clears EC at 580. The method continues from 578 (if false) and 580 at 584. At 584, the method calculates EC. The method continues from 584 with 440.

If 572 is false, the method continues at 586 and determines whether a Clause 45: address access is received. If 586 is true, the method continues at 588 and sets CA equal to Clause 45: EC Address. At 590, the method updates the stored address. At 592, the method clears EC. At 594, the method updates Status.OP and clears Status.P. At 596, the method calculates EC. At 598, the method releases the CA. The method continues from 598 with 440.

If 586 is false, the method continues at 630 (FIG. 20B) and determines whether a Clause 45: Write access is received. If 630 is true, the method continues at 634 and sets CA equal to Clause 45: Write. At 638, the method determines whether the PA is equal to Clause 45: Address. If 638 is true, the method updates Status.OP and clears Status.P. At 644, the method calculates EC and then continues at 440. If 638 is false, the method clears EC at 648 and continues at 642.

If 630 is false, the method continues at 654 and determines whether a Clause 45: Read access is received. If 654 is true, the method continues at 656 and sets CA equal to Clause 45: Read. At 658, the method determines whether PA is equal to Clause 45: Address. If 658 is true, the method continues at 662 and updates Status.OP and clears Status.P. At 666, the method releases CA and calculates EC and returns data at 668. If 658 is false, the method continues at 670, clears EC and continues at 662.

If 654 is false, the method continues at 674. At 674, the method determines whether a Clause 45: Read and Post Increment Address access is received. If 674 is true, the method continues at 676 and sets CA equal to Clause 45: Read and Post Increment Address. At 678, the method determines whether PA=clause 45: Address. If 678 is true, the method continues at 682 and updates Status.OP and clears Status.P. At 686, the method releases CA and calculates EC and returns data at 687. If 678 is false, the method continues at 688, clears EC and continues at 682. If 674 is false, CA is set to NULL. The method continues from 644, 668, 687 and 672 with 440.

What is claimed is:

1. A first serial management interface device comprising:
an input/output pin;
a register; and
a controller configured to:
send a first frame to a second serial management interface device via the input/output pin;
generate an error code based on the first frame sent to the second serial management interface device; and
store the error code in the register to send to the second serial management interface device.

2. The first serial management interface device of claim 1 wherein the controller is configured to send the error code in a second frame to the second serial management interface device via the input/output pin.

3. The first serial management interface device of claim 2 wherein the error code is further based on a portion of the second frame.

4. The first serial management interface device of claim 2 wherein the controller is configured to generate the first and second frames in a frame format compliant with one of Clause 22 and Clause 45 of IEEE 802.3-2018.

5. A system comprising the first and second serial management interface devices of claim 2, wherein the second serial management interface device comprises:
a second register; and
a second controller configured to:
generate a second error code based on the first frame received from the first serial management interface device; and
write data received in the first frame to the second register in response to the second error code matching the error code in the second frame received from the first serial management interface device.

6. A system comprising the first and second serial management interface devices of claim 1, wherein the second serial management interface device comprises:
a second input/output pin;
a second register; and
a second controller configured to:
send a second frame including data read from the second register to the first serial management interface device via the second input/output pin in response to receiving the first frame;
generate a second error code based on the data in the second frame sent to the first serial management interface device; and
send a third frame including the second error code to the first serial management interface device via the second input/output pin;
wherein the controller of the first serial management interface device is configured to:
generate a third error code based on the data in the second frame received from the second serial management interface device; and
verify whether the data received in the second frame is correct based on whether the third error code matches the second error code in the third frame received from the second serial management interface device.

7. A system comprising the first and second serial management interface devices of claim 1, wherein the second serial management interface device comprises:
a second input/output pin;
a second register; and
a second controller configured to send a second frame including data read from the second register to the first serial management interface device via the second input/output pin in response to receiving the first frame,
wherein the controller of the first serial management interface device is configured to write the data received in the second frame to the register of the first serial management interface device without verification.

8. The system of claim 7 wherein writing the data to the register without verification includes writing the data to the register without receiving a third frame from the second serial management interface device including a second error code generated based on the second frame.

* * * * *